United States Patent
Mori et al.

[11] Patent Number: 6,140,449
[45] Date of Patent: Oct. 31, 2000

[54] CROSSLINKABLE SILICON POLYMER COMPOSITIONS

[75] Inventors: Shigeru Mori; Eiichi Tabei, both of Gunma, Japan

[73] Assignee: Shin-Etsu Chemical Co., Ltd., Tokyo, Japan

[21] Appl. No.: 09/236,589

[22] Filed: Jan. 26, 1999

[30] Foreign Application Priority Data

Jan. 27, 1998 [JP] Japan .................................. 10-029322

[51] Int. Cl.⁷ .................................................. C08G 77/08
[52] U.S. Cl. ................................ 528/21; 528/24; 528/31; 528/26
[58] Field of Search .................................. 528/21, 24, 26, 528/31

[56] References Cited

U.S. PATENT DOCUMENTS

| | | | |
|---|---|---|---|
| 3,992,427 | 11/1976 | Chandra et al. | 260/448.2 E |
| 4,602,050 | 7/1986 | West et al. | 522/135 |
| 4,639,501 | 1/1987 | Seyferth et al. | 528/15 |
| 5,070,116 | 12/1991 | Seyforth et al. | 523/22 |
| 5,359,106 | 10/1994 | Tabei et al. | 556/413 |
| 5,384,382 | 1/1995 | Mori et al. | 528/15 |

FOREIGN PATENT DOCUMENTS

| | | |
|---|---|---|
| 62-201933 | 9/1987 | Japan . |
| 4-311728 | 11/1992 | Japan . |
| 5-32899 | 2/1993 | Japan . |
| 5-59176 | 3/1993 | Japan . |
| 5-310946 | 11/1993 | Japan . |

OTHER PUBLICATIONS

English Abstract for Japan 4–311728.
English Abstract for Japan 5–32899.
English Abstract for Japan 5–59176.
English Abstract for Japan 5–310946.
R. West, "The Polysilane High Polymers," *Journal of Organometallic Chemistry*, vol. 300, pp. 327–346 (1986).

*Primary Examiner*—Margaret G. Moore
*Attorney, Agent, or Firm*—Millen, White, Zelano & Branigan, P.C.

[57] ABSTRACT

A crosslinkable silicon polymer composition is provided comprising (A) a silicon polymer containing Si—Si bonds and Si—H groups and having a Mn of 500–500,000, (B) a polyfunctional aromatic carboxylic acid allyl ester, and (C) an organic peroxide or azo compound. The composition cures into a crosslinked polysilane film which is solvent insoluble, tough, and abrasion resistant.

15 Claims, No Drawings

CROSSLINKABLE SILICON POLYMER COMPOSITIONS

This invention relates to a crosslinkable silicon polymer composition which cures into a solvent insoluble, tough polymer film.

BACKGROUND OF THE INVENTION

Siloxane compositions which cure through hydrosilylation reaction have the advantage that curing proceeds quickly to the deep interior without forming by-products. Because of this advantage, siloxane compositions are used in a variety of applications, for example, as molded rubber, adhesives, potting compounds for electric and electronic parts, and release coatings for paper and film.

Methods for the crosslinking of polysilanes are under consideration. For example, Robert West et al. reported that a composition comprising a polysilane having hydrogen as side chain substituents and trivinylphenylsilane can be cured through hydrosilylation catalyzed by chloroplatinic acid. This system, however, suffers from the problems that the side chain substituents are less reactive and that polysilane chains are cleaved by the chloroplatinic acid catalyst and further oxidized.

Robert West, Journal of Organometallic Chemistry, vol. 300, pp. 327–346, 1986, also reports that a polysilane having alkenyl groups in side chains, alone or in combination with a polyfunctional unsaturated compound, can be cured through photo-crosslinking reaction. However, the crosslinked film cannot retain the properties of polysilane because this method utilizes cleavage of polysilane chains.

With respect to the technique of bonding a Si—H group-bearing compound to an alkenyl group-bearing compound through hydrosilylation, various examples are disclosed in JP-A 201933/1987 corresponding to U.S. Pat. No. 4,639,501. This method relates to a method for preparing pre-ceramic organopolymers, but not to a technique of forming crosslinked films. It is not indicated whether a tough, solvent-insoluble film can be formed by this method. Similarly, no allyl alcohol esters are disclosed as examples of the alkenyl compounds subject to hydrosilylation.

The crosslinking of polysilanes through hydrosilylation is disclosed in many other patents, for example, JP-A 311728/1992, 32899/1993, 59176/1993, and 310946/1993. None of these methods, however, indicate the use of allyl alcohol esters as the crosslinking agent.

SUMMARY OF THE INVENTION

Therefore, an object of the invention is to provide a crosslinkable silicon polymer composition which cures into a silicon polymer film, especially a polysilane film, which is tough and solvent insoluble even when it is of submicron order thick.

We have found that a composition comprising a silicon polymer, typically polysilane, containing Si—Si bonds and Si—H groups, a polyfunctional aromatic carboxylic acid allyl ester of the following formula (1), and a radical generator in a solvent is easy to form a film by a common technique. Since Si—Si bonds are not cleaved by heating, the crosslinked silicon polymer film is insoluble in solvents and tough.

In general, silicon polymers are soluble in a variety of solvents and can be applied to form films, but the films often have low strength or poor abrasion resistance. For overcoming the drawback of the silicon polymer film, it is contemplated to overcoat the film with another coating material. However, intermixing of the silicon polymer and the coating material can occur, failing to take advantage of the properties of the silicon polymer.

We have found that when a composition comprising a silicon polymer (typically polysilane) containing Si—Si bonds and Si—H groups, a polyfunctional aromatic carboxylic acid allyl ester, a radical generator, and a solvent is applied to form a film and heated, the resulting silicon polymer film becomes crosslinked so that the film is no longer soluble in solvents. This crosslinked silicon polymer film is tough enough to find use in the application where abrasion resistance and durable strength are required.

Accordingly, the invention provides a crosslinkable silicon polymer composition comprising (A) a silicon polymer containing Si—Si bonds and Si—H groups and having a weight average molecular weight of 500 to 500,000, (B) a polyfunctional aromatic carboxylic acid allyl ester of the following formula (1):

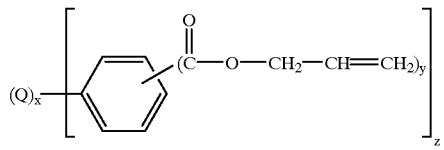

wherein Q is —CO—, $CH_2$— or —$C(CH_3)_2$—, letter x is equal to 0 or 1, y is equal to 2, 3 or 4, and z is equal to 1 or 2, and (C) an organic peroxide or azo compound.

DETAILED DESCRIPTION OF THE INVENTION

Component (A) of the silicon polymer composition according to the invention is a silicon polymer containing Si—Si bonds and Si—H groups and having a weight average molecular weight of 500 to 500,000.

Included in the silicon polymers which can be used herein are those polymers composed of polysilane bonds, for example, those of the following formula (2).

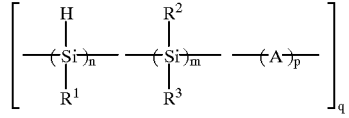

In formula (2), $R^1$ to $R^3$ are independently substituted or unsubstituted monovalent hydrocarbon groups, alkoxy groups or halogen atoms, A is a divalent organic group, letters m, n and p are numbers satisfying $0.01 < n/(n+m+p) \leq 1$, $0 \leq m/(n+m+p) < 1$, and $0 \leq p/(n+m+p) < 1$, q is such a number satisfying $n \times q \geq 2$ that the polysilane may have a weight average molecular weight of 500 to 500,000.

More illustratively, $R^1$ to $R^3$ in formula (2) represent substituted or unsubstituted aliphatic, alicyclic or aromatic monovalent hydrocarbon groups. Of these, the aliphatic or alicyclic hydrocarbon groups are preferably those of 1 to 12 carbon atoms, more preferably 1 to 8 carbon atoms, for example, alkyl and cycloalkyl groups such as methyl, ethyl, propyl, butyl, pentyl, hexyl, cyclopentyl, and cyclohexyl.

The aromatic hydrocarbon groups are preferably those of 6 to 14 carbon atoms, more preferably 6 to 10 carbon atoms, for example, aryl and aralkyl groups such as phenyl, tolyl, xylyl, naphthyl, benzyl and phenethyl. The substituted hydrocarbon groups are those of the above-mentioned unsubstituted hydrocarbon groups in which some or all of the hydrogen atoms are replaced by halogen atoms, alkoxy groups, amino groups, or aminoalkyl groups, for example, p-dimethylaminophenyl and m-dimethylaminophenyl.

The divalent organic groups represented by A are preferably those of 1 to 20 carbon atoms, especially 2 to 20 carbon atoms. Some illustrative examples are given below.

—(CH$_2$)$_r$— wherein r is 1 to 12,
—C(CH$_3$)$_2$—,

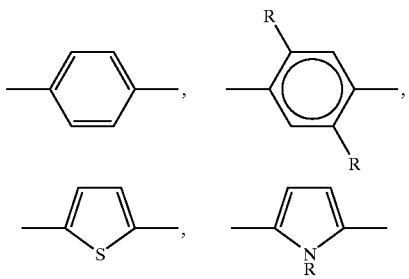

wherein R is H or C$_{1-12}$ alkyl.

Component (B) is a polyfunctional aromatic carboxylic acid allyl ester of the following formula (1):

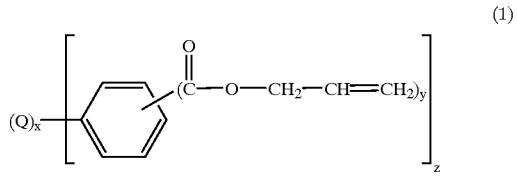

wherein Q is —CO—, CH$_2$— or —C(CH$_3$)$_2$—, letter x is equal to 0 or 1, y is equal to 2, 3 or 4, and z is equal to 1 or 2.

The amount of the polyfunctional aromatic carboxylic acid allyl ester blended is preferably 1 to 150 parts by weight, more preferably 5 to 50 parts by weight per 100 parts by weight of component (A). On this basis, less than 1 part of the ester would be too small to induce crosslinking, failing to produce a solvent-insoluble, tough film. With more than 150 parts of the ester, a crosslinked film is obtained, but it can be whitened or roughened at the surface or cracked.

Component (C) is an organic peroxide or azo compound. Illustrative organic peroxides are 3,3',4,4'-tetra(t-butylperoxycarbonyl)benzophenone, cumene hydroperoxide, dicumyl peroxide, t-butylcumyl peroxide, benzoyl peroxide, and bis(t-butylperoxy)isophthalate. Illustrative azo compounds are 2,2'-azobisisobutyronitrile, 2,2'-azobis-2-methylbutyronitrile, 2,2'-azobis-2,4-dimethylvaleronitrile, and 1,1'-azobis(cyclohexane-1-carbonitrile).

The amount of component (C) blended is preferably 1 to 50 parts by weight, more preferably 3 to 25 parts by weight per 100 parts by weight of components (A) and (B) combined. On this basis, less than 1 part of component (C) would be too small to induce crosslinking, failing to produce a solvent-insoluble, tough film. With more than 50 parts of component (C), a film can be whitened or roughened at the surface.

The composition of the invention is preferably used in solution form which is obtained by dissolving components (A) to (C) in a solvent. Exemplary solvents are toluene, xylene, THF, anisole, ether, dibutyl ether, ethyl acetate, butyl acetate, propylene glycol monomethyl ether acetate, cyclohexane, dichloromethane, ethyl lactate, and ethyl 3-ethoxypropionate.

Other components may be blended in the composition insofar as the advantages of the invention are not impaired.

A silicon polymer film is obtained from the composition of the invention by applying the composition to a given substrate to the predetermined thickness, and heating the film at about 100 to about 200° C., preferably in a non-oxidizing atmosphere. Upon heating, addition reaction takes place between Si—H groups in component (A) and aliphatic unsaturated bonds in component (B) to induce crosslinking, thereby forming a crosslinked film which is insoluble in solvents and tough. Therefore, the composition of the invention is advantageously used as photoconductive materials, electronic devices, and patterning materials.

There has been described a silicon polymer composition comprising a silicon polymer, typically polysilane, a polyfunctional aromatic carboxylic acid allyl ester, and an organic peroxide or azo compound. From the composition, a polysilane film having solvent insolubility, abrasion resistance and improved strength can be obtained.

EXAMPLE

Examples of the invention are given below by way of illustration and not by way of limitation. All parts are by weight. Acronym Me is methyl, Ph is phenyl, Mn is a number average molecular weight, and Mw is a weight average molecular weight.

Example 1

In 100 parts of toluene were dissolved 8 parts of [(Ph$_2$Si)$_4$(Me$_2$Si—C$_6$H$_4$—SiMe$_2$)$_2$(MeHSi)$_2$]$_n$ having a Mn of 5,400 and a Mw of 8,900, 2 parts of TRIAM-705 (triallyl trimellitate, Wako Junyaku K.K.), and 2 parts of a 25% toluene solution of BTTB-25 which is 3,3',4,4'-tetra(t-butylperoxycarbonyl)-benzophenone. Using a spin coater, the solution was coated onto a glass plate to form a film of 0.1 μm thick. After film formation, the coated glass plate was rested for 5 minutes on a hot plate at 190° C. in a nitrogen atmosphere, to thereby induce crosslinking. On a pencil hardness test, the crosslinked film showed a hardness of 5H.

On a toluene solubility test, the film was insoluble in toluene and kept firmly bonded to the glass plate. With respect to the UV absorbing characteristics inherent to silicon polymers, the film showed no change before and after crosslinking, which indicated the retention of Si—Si bonds.

Comparative Example 1

The procedure of Example 1 was repeated except that TRIAM-705 was omitted. The thus obtained film showed a pencil hardness of H and was readily dissolved away in toluene.

The procedure of Example 1 was also repeated except that BTTB-25 was omitted. The thus obtained film showed a pencil hardness of H and was readily dissolved away in toluene.

Example 2

The procedure of Example 1 was repeated except that TRIAM-705 (triallyl trimellitate, Wako Junyaku K.K.) was replaced by TRIAM-805 (tetraallyl pyromellitate, Wako Junyaku K.K.). On a toluene solubility test, the thus obtained film was insoluble in toluene. With respect to the UV absorbing characteristics inherent to silicon polymers, the film showed no change before and after crosslinking, which indicated the retention of Si—Si bonds.

Example 3

The procedure of Example 2 was repeated except that anisole was used as the solvent. On a toluene solubility test, the thus obtained film was insoluble in toluene. With respect to the UV absorbing characteristics inherent to silicon polymers, the film showed no change before and after crosslinking, which indicated the retention of Si-Si bonds.

Example 4

A solution was prepared as in Example 1 except that TTB-25 was replaced by 1.5 parts of an azo compound (2,2'-azobisisobutyronitrile). Using a spin coater, a film of 0.1 μm thick was formed from the solution. Also, using a bar coater, a film of 1 μm thick was formed. The respective films were rested for 5 minutes on a hot plate at 190° C. in a nitrogen atmosphere, to thereby induce crosslinking. On a pencil hardness test, both the crosslinked films showed a hardness of 5H.

On a toluene solubility test, the films were insoluble in toluene and kept firmly bonded to the substrates. With respect to the UV absorbing characteristics inherent to silicon polymers, the films showed no change before and after crosslinking, which indicated the retention of Si—Si bonds.

Comparative Example 2

The procedure of Example 4 was repeated except that trimethylolpropane triacrylate was used instead of TRIAM-705. On a pencil hardness test, both the films of 0.1 μm and 1 μm thick showed a hardness of 2H. On a toluene solubility test, both the films were dissolved away.

Japanese Patent Application No. 029322/1998 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A crosslinkable silicon polymer composition comprising (A) a silicon polymer containing Si—Si bonds and Si—H groups and having a weight average molecular weight of 500 to 500,000, (B) a polyfunctional aromatic carboxylic acid allyl ester of the following formula (1):

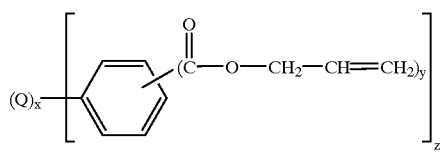

wherein Q is —CO—, CH$_2$— or —C(CH$_3$)$_2$—, letter x is equal to 0 or 1, y is equal to 2, 3 or 4, and z is equal to 1 or 2, and (C) an organic peroxide or azo compound.

2. The composition of claim 1 wherein said silicon polymer (A) comprises a polysilane.

3. The composition of claim 1 wherein said silicon polymer (A) contains Si—Si bonds, Si—H groups and polyvalent hydrocarbon groups.

4. The composition of claim 2, wherein the polysilane has formula (2)

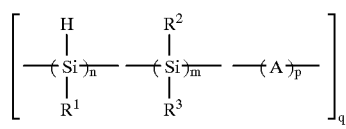

wherein R$^1$ to R$^3$ are independently substituted or unsubstituted monovalent hydrocarbon groups, alkoxy groups or halogen atoms, A is a divalent organic group, m, n and p are numbers satisfying 0.01<n/(n+m+p)≦1, 0≦m/(n+m+p)<1, and 0≦p/(n+m+p)<1, and q is a number satisfying n×q≧2.

5. The composition of claim 4, wherein R$^1$, R$^2$ and R$^3$ are, independently, C$_1$–C$_{12}$ aliphatic or alicyclic or C$_6$–C$_{14}$ aromatic monovalent hydrocarbon groups, in which some or all of the hydrocarbon atoms are optionally replaced by halogen atoms, alkoxy groups, amino groups, or aminoalkyl groups.

6. The composition of claim 5, wherein the aliphatic or alicyclic hydrocarbon groups have 1 to 8 carbon atoms and the aromatic hydrocarbon groups have 6 to 10 carbon atoms.

7. The composition of claim 5, wherein the alkyl or cycloalkyl hydrocarbon groups are methyl, ethyl, propyl, butyl, pentyl, hexyl, cyclopentyl or cyclohexyl; the aromatic hydrocarbon groups are phenyl, tolyl, xylyl, naphthyl, benzyl or phenethyl; and hydrogen atoms are substituted by p-dimethylaminophenyl or m-dimethylaminophenyl.

8. The composition of claim 4, wherein divalent organic group A has 1 to 20 carbon atoms.

9. The composition of claim 8, wherein divalent organic group A has 2 to 20 carbon atoms.

10. The composition of claim 4, wherein A is

—(CH$_2$)$_r$— wherein r is 1 to 12,

—C(CH$_3$)$_2$—,

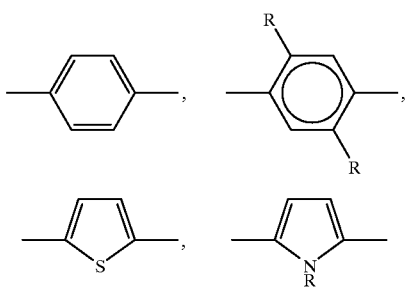

wherin R is H or $C_{1-12}$ alkyl.

11. The composition of claim 1, wherein the amount of component (B) is 1 to 150 parts by weight per 100 parts of component (A).

12. The composition of claim 1, wherein the amount of component (B) is 5 to 50 parts by weight per 100 parts of component (A).

13. The composition of claim 1, wherein component (C) is 3,3',4,4'-tetra(t-butylperoxycarbonyl)benzophenone, cumene hydroperoxide, dicumyl peroxide, t-butylcumyl peroxide, benzoyl peroxide, bis(t-butylperoxy)isophthalate, 2,2'-azobisisobutyronitrile, 2,2'-azobis-2-methylbutyronitrile, 2,2'-azobis-2,4-dimethylvaleronitrile, or 1,1'-azobis(cyclohexane-1-carbonitrile).

14. The composition of claim 1, wherein the amount of the component (C) is 1 to 50 parts by weight per 100 parts by weight of components (A) and (B) combined.

15. The composition of claim 1, wherein the amount of component (C) is 3 to 25 parts by weight per 100 parts by weight of compounds (A) and (B) combined.

* * * * *